(12) United States Patent
Marshak et al.

(10) Patent No.: US 7,257,653 B1
(45) Date of Patent: Aug. 14, 2007

(54) SWITCHING BETWEEN COPY MODE AND SYNCHRONOUS RDF MODE

(75) Inventors: Marik Marshak, Newton, MA (US); Mark Halstead, Watertown, MA (US); Gilad Sade, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 687 days.

(21) Appl. No.: 10/673,853

(22) Filed: Sep. 29, 2003

(51) Int. Cl.
*G06F 13/10* (2006.01)
*G06F 12/00* (2006.01)

(52) U.S. Cl. .................... 710/74; 711/161; 711/162
(58) Field of Classification Search .............. None
See application file for complete search history.

(56) References Cited

U.S. PATENT DOCUMENTS

| | | | |
|---|---|---|---|
| 5,206,939 A | | 4/1993 | Yanai et al. |
| 5,742,792 A | * | 4/1998 | Yanai et al. ............. 711/162 |
| 5,778,394 A | | 7/1998 | Galtzur et al. |
| 5,845,147 A | | 12/1998 | Vishlitzky et al. |
| 5,857,208 A | | 1/1999 | Ofek |
| 6,304,946 B1 | | 10/2001 | Mason, Jr. |
| 6,735,637 B2 | * | 5/2004 | Cochran ..................... 710/5 |
| 7,111,004 B2 | * | 9/2006 | Beardsley et al. ............ 707/8 |

* cited by examiner

*Primary Examiner*—Ilwoo Park
(74) *Attorney, Agent, or Firm*—Muirhead and Saturnelli, LLC

(57) ABSTRACT

Transferring data from a local storage device to a remote storage device includes providing, to a portion of the local storage device, data to be transferred from the local storage device to the remote storage device using a first mode that accesses an indicator of data being transferred, selecting a second mode for transferring data different from the first mode, where the second mode does not require the indicator, subdividing the portion of the local storage device into chunks, for each of the chunks, transferring the data, and, after all of the data from the chunks has been transferred, using the second mode for transferring data that is provided to the local storage device after selecting the second mode. Transferring data from a local storage device to a remote storage device may also include, prior to all of the data from the chunks being transferred, using a transition mode different from the first and second modes to transfer data that is provided to the local storage device after selecting the second mode, where the transition mode does not require the indicator.

16 Claims, 9 Drawing Sheets

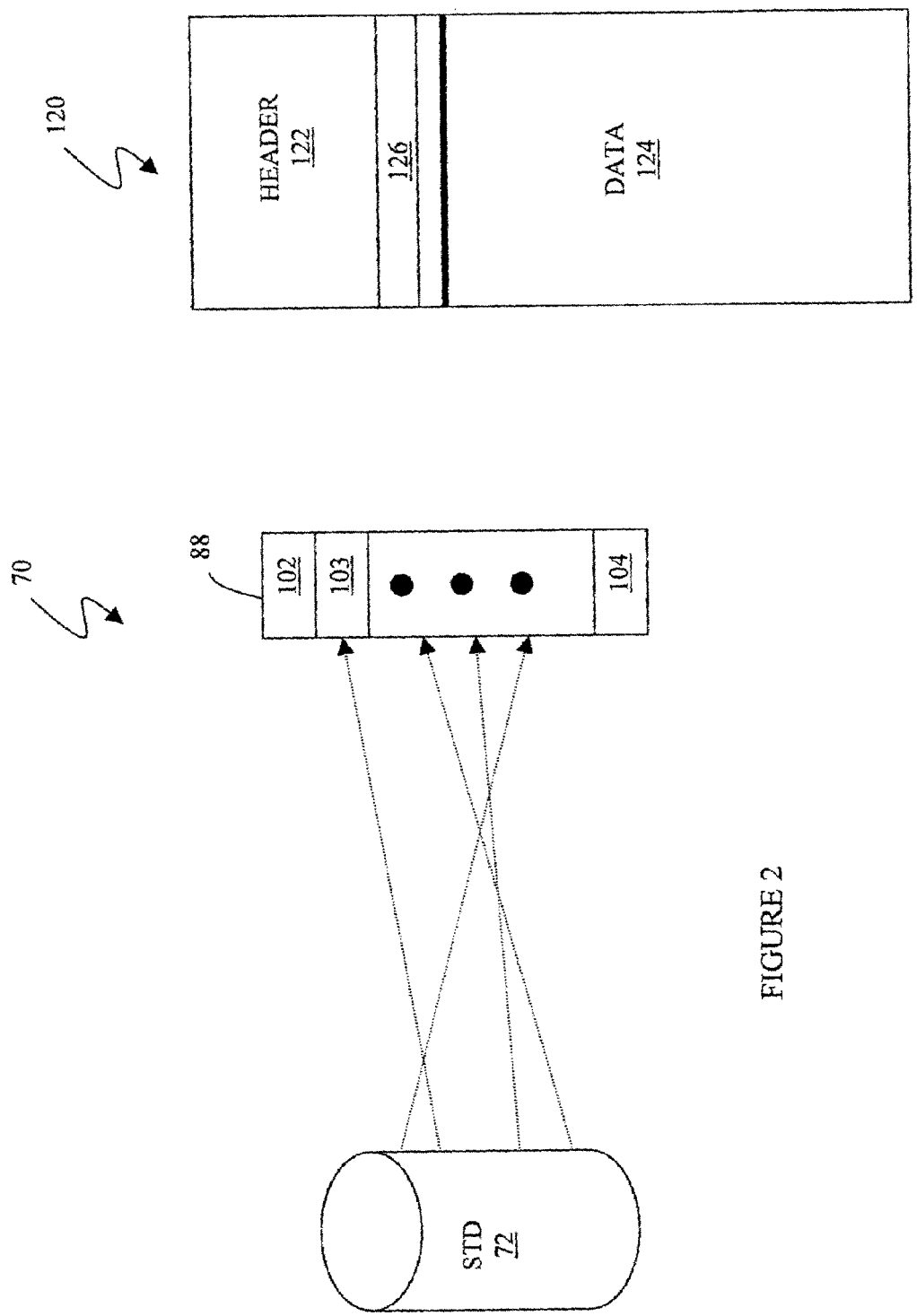

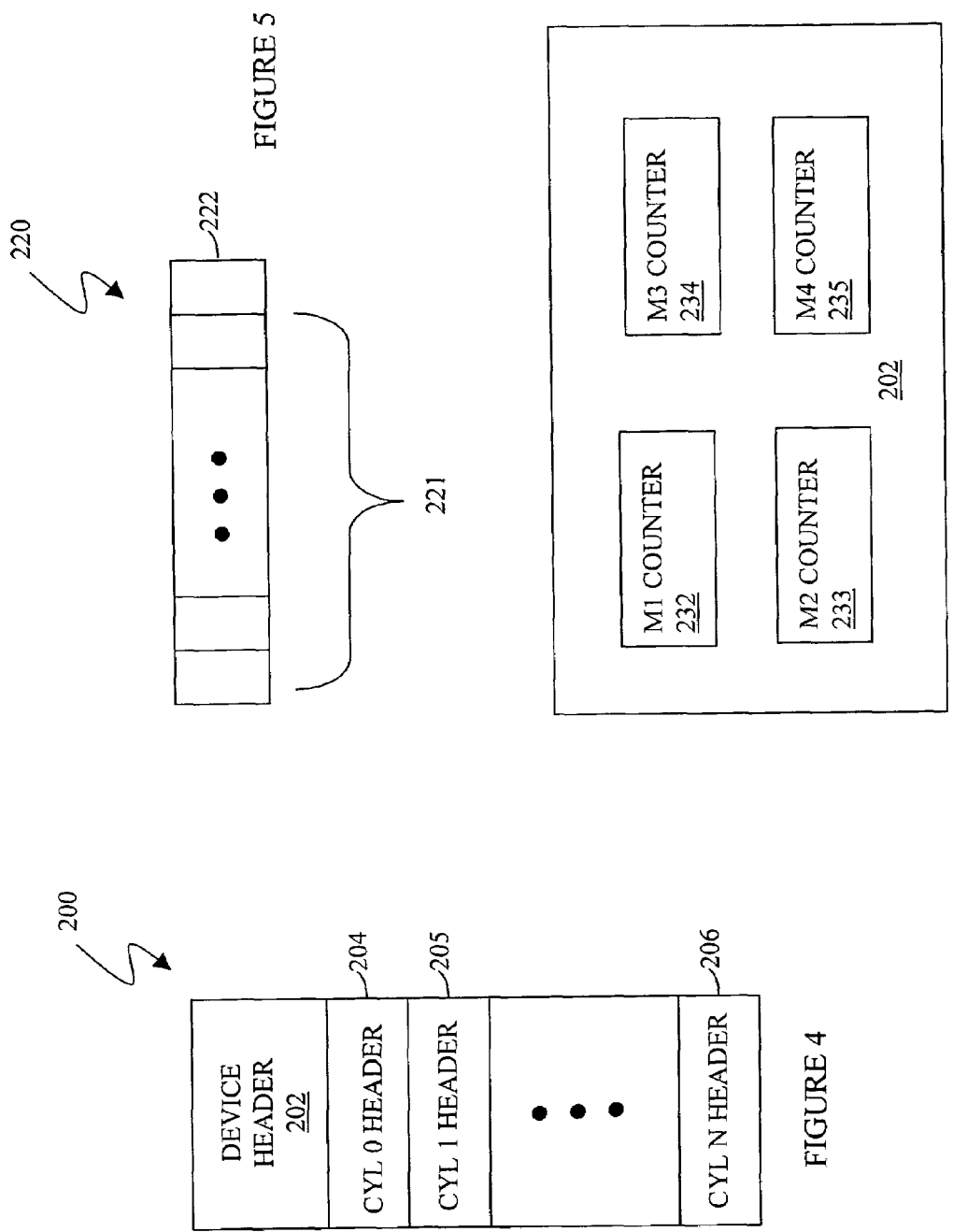

SWITCHING BETWEEN COPY MODE AND SYNCHRONOUS RDF MODE

BACKGROUND OF THE INVENTION

1. Technical Field

This application relates to computer storage devices, and more particularly to the field of transferring data between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

In some instances, it may be desirable to copy or mirror data from one storage device to one or more others. For example, if a host writes data to a first storage device, it may be desirable to copy that data to a second storage device provided in a different location so that if a disaster occurs that renders the first storage device inoperable, the host (or another host) may resume operation using the data of the second storage device. Mirrored systems may be used for many purposes, ranging from preservation of real-time operations during back-up to data center migration, and mirrors may be located in any two or more different logical devices. An example of mirrored system capability is provided, for example, by the Symmetrix Remote Data Facility (RDF) product provided by EMC Corporation of Hopkinton, Mass. and further described, for example, in U.S. Pat. No. 5,742,792. With RDF, a first storage device, denoted the "primary storage device" (or "R1") is coupled to the host. One or more other storage devices, called "secondary storage devices" (or "R2") receive copies of the data that is written to the primary storage device by the host. The host interacts directly with the primary storage device, but any data changes made to the primary storage device are automatically provided to the one or more secondary storage devices using RDF. The primary and secondary storage devices may be connected by a data link, such as an ESCON link, a Fibre Channel link, and/or a Gigabit Ethernet link. The RDF functionality may be facilitated with an RDF adapter (RA) provided at each of the storage devices.

In any mirrored system, it is necessary to determine whether data will be written to all mirrors in a synchronous or near-synchronous mode, or whether a primary storage device will be written in advance of its mirrors (asysnchronous mode). There are advantages and disadvantages to both approaches. Thus, certain mirroring systems may allow or require switching between asynchronous and synchronous modes in certain circumstances. For example, RDF allows synchronous data transfer where, after data written from a host to a primary storage device is transferred from the primary storage device to a secondary storage device using RDF, receipt is acknowledged by the secondary storage device to the primary storage device which then provides a write acknowledge back to the host. Thus, in synchronous mode, the host does not receive a write acknowledge from the primary storage device until the RDF transfer to the secondary storage device has been completed and acknowledged by the secondary storage device.

A drawback to the synchronous RDF system is that the latency of each of the write operations is increased by waiting for the acknowledgement of the RDF transfer. This problem is worse when there is a long distance between the primary storage device and the secondary storage device; because of transmission delays, the time delay required for making the RDF transfer and then waiting for an acknowledgement back after the transfer is complete may be unacceptable.

It is also possible to use RDF in an a semi-synchronous mode, in which case the data is written from the host to the primary storage device which acknowledges the write immediately and then, at the same time, begins the process of transferring the data to the secondary storage device. Thus, for a single transfer of data, this scheme overcomes some of the disadvantages of using RDF in the synchronous mode. However, for data integrity purposes, the semi-synchronous transfer mode does not allow the primary storage device to transfer data to the secondary storage device until a previous transfer is acknowledged by the secondary storage device. Thus, the bottlenecks associated with using RDF in the synchronous mode are simply delayed by one iteration because transfer of a second amount of data cannot occur until transfer of previous data has been acknowledged by the secondary storage device.

Another possibility is to have the host write data to the primary storage device in an asynchronous mode and have the primary storage device copy data to the secondary storage device in the background (sometime called "ADP Copy mode"). The background copy involves cycling through each of the subdivisions and corresponding tracks of the primary storage device sequentially and, when it is determined that a particular block has been modified since the last time that block was copied, the block is transferred from the primary storage device to the secondary storage device. Although this mechanism may attenuate the latency problem associated with synchronous and semi-synchronous data transfer modes, a difficulty still exists because there can not be a guarantee of data consistency between the primary and secondary storage devices. If there are problems, such as a failure of the primary system, the secondary system may end up with out-of-order changes that make the data unusable.

Accordingly, in some instances, it is appropriate to switch between ADP Copy mode and synchronous or semi-synchronous RDF transfer modes to take advantage of the benefits of both systems. However, to complete the transition from ADP Copy mode to synchronous or semi-synchronous RDF transfer mode, it is necessary to have finished transferring all of the write pending data left over from the ADP copy mode. The overhead associated with this may be unacceptable in some situations. Thus, it is desirable to have an RDF system that transitions from ADP copy mode to synchronous or semi-synchronous RDF transfer mode without all of the overhead associated with transferring the left over write pending ADP copy data.

SUMMARY OF THE INVENTION

According to the present invention, transferring data from a local storage device to a remote storage device includes providing, to a portion of the local storage device, data to be transferred from the local storage device to the remote storage device using a first mode that accesses an indicator of data being transferred, selecting a second mode for transferring data different from the first mode, where the second mode does not require the indicator, subdividing the portion of the local storage device into chunks, for each of the chunks, transferring the data, and, after all of the data from the chunks has been transferred, using the second mode for transferring data that is provided to the local storage device after selecting the second mode. Transferring data from a local storage device to a remote storage device may also include, prior to all of the data from the chunks being transferred, using a transition mode different from the first and second modes to transfer data that is provided to the local storage device after selecting the second mode, where the transition mode does not require the indicator. The indicator may indicates a subsection of the local storage device is being transferred. The local storage device may be subdivided into cylinders and the cylinders may be subdivided into tracks and the indicator may include a first data element indicating which cylinders contain data to be transferred and a second data element indicating which tracks contain data to be transferred. Transferring data from a local storage device to a remote storage device may also include providing at least one counter that keeps track of data within the chunks that have been examined for possible transferring to the remote storage device. Transferring data from a local storage device to a remote storage device may also include determining that all of the chunks have been transferred when the at least one counter indicates that all of the data has been examined.

According further to the present invention, transferring data from a local storage device to a plurality of remote storage devices includes providing, to a portion of the local storage device, data to be transferred from the local storage device to the remote storage devices using a first mode that accesses an indicator of data being transferred, selecting a second mode for transferring data different from the first mode, where the second mode does not require the indicator, subdividing the portion of the local storage device into chunks, for each of the chunks, transferring the data, and, for each of the remote storage devices, after all of the data from the chunks has been transferred, using the second mode for transferring data that is provided to the local storage device after selecting the second mode. Transferring data from a local storage device to a plurality of remote storage devices may also include, prior to all of the data from the chunks being transferred to a particular one of the remote storage devices, using a transition mode different from the first and second modes to transfer, to the particular one of the remote storage devices, data that is provided to the local storage device after selecting the second mode, where the transition mode does not require the indicator. Transferring data from a local storage device to a plurality of remote storage devices may also include providing a counter for at least one of the remote storage devices that keeps track of data within the chunks that have been examined for possible transferring to the at least one of the remote storage devices. Transferring data from a local storage device to a plurality of remote storage devices may also include determining that all of the chunks have been transferred to the at least one of the remote storage devices when the counter indicates that all of the data has been examined.

According further to the present invention, computer software that transfers data from a local storage device to a remote storage device includes executable code that provides, to a portion of the local storage device, data to be transferred from the local storage device to the remote storage device using a first mode that accesses an indicator of data being transferred, executable code that subdivides the portion of the local storage device into chunks after a second mode for transferring data different from the first mode has been selected, where the second mode does not require the indicator, executable code that transfers the data for each of the chunks, and executable code that, after all of the data from the chunks has been transferred, uses the second mode for transferring data that is provided to the local storage device after selecting the second mode. The computer software may further include executable code that, prior to all of the data from the chunks being transferred, uses a transition mode different from the first and second modes to transfer data that is provided to the local storage device after selecting the second mode, where the transition mode does not require the indicator. The computer software may further include executable code that provides at least one counter that keeps track of data within the chunks that have been examined for possible transferring to the remote storage device. The computer software may further include executable code that determines that all of the chunks have been transferred when the at least one counter indicates that all of the data has been examined.

According further to the present invention, computer software that transfers data from a local storage device to a plurality of remote storage devices includes executable code that provides, to a portion of the local storage device, data to be transferred from the local storage device to the remote storage devices using a first mode that accesses an indicator of data being transferred, executable code that subdivides the portion of the local storage device into chunks after a second mode for transferring data different from the first mode has been selected, where the second mode does not require the indicator, executable code that transfers the data for each of the chunks, and executable code that, for each of the remote storage devices, after all of the data from the chunks has been transferred, uses the second mode for transferring data that is provided to the local storage device after selecting the second mode. The computer software may further include executable code that, prior to all of the data from the chunks being transferred to a particular one of the remote storage devices, uses a transition mode different from the first and second modes to transfer, to the particular one of the remote storage devices, data that is provided to the local storage device after selecting the second mode, where the transition mode does not require the indicator. The computer software may further include executable code that provides a counter for at least one of the remote storage devices that keeps track of data within the chunks that have been examined for possible transferring to the at least one of the remote storage devices. The computer software may further include executable code that determines that all of the chunks have been transferred to the at least one of the remote storage devices when the counter indicates that all of the data has been examined.

According further to the present invention, a system for transferring data to at least one remote storage device includes a plurality of host adaptors that receive and send commands and data, at least one memory coupled to the plurality of host adaptors, a plurality of disk adaptors coupled to the at least one memory and the plurality of host adaptors, a plurality of disk drive units coupled to the plurality of disk adaptors, a plurality of data transmission adaptors coupled to the plurality of host adaptors, the at least one memory, the plurality of disk adaptors, and the plurality of disk drive units, where the data transmission adaptors send data to the at least one remote storage device, a portion that receives data to be transferred from the local storage device to the remote storage devices using a first mode that accesses an indicator of data being transferred, executable code that subdivides the portion into chunks after a second mode for transferring data different from the first mode has been selected, where the second mode does not require the indicator, executable code that transfers the data for each of the chunks, and executable code that, for each of the at least one remote storage device, uses the second mode for transferring data that is provided after selecting the second mode, where the second modes is used after all of the data from the chunks has been transferred. The system may also include executable code that, prior to all of the data from the chunks being transferred, uses a transition mode different from the first and second modes to transfer data that is provided to the system after selecting the second mode, where the transition mode does not require the indicator.

BRIEF DESCRIPTION OF DRAWINGS

FIG. 2 is a schematic diagram illustrating use of a cache according to the system described herein.

FIG. 3 is a diagram illustrating a data structure for a cache slot used in connection with the system described herein.

FIG. 4 is a diagram illustrating a data structure used to handle logical device overhead information according to the system described herein.

FIG. 5 is a diagram illustrating a data structure used in connection with each cylinder header to determine write pending information for tracks of the cylinder according to the system described herein.

FIG. 6 is a diagram illustrating counters used in connection the system described herein.

DETAILED DESCRIPTION OF VARIOUS EMBODIMENTS

Figure 1:
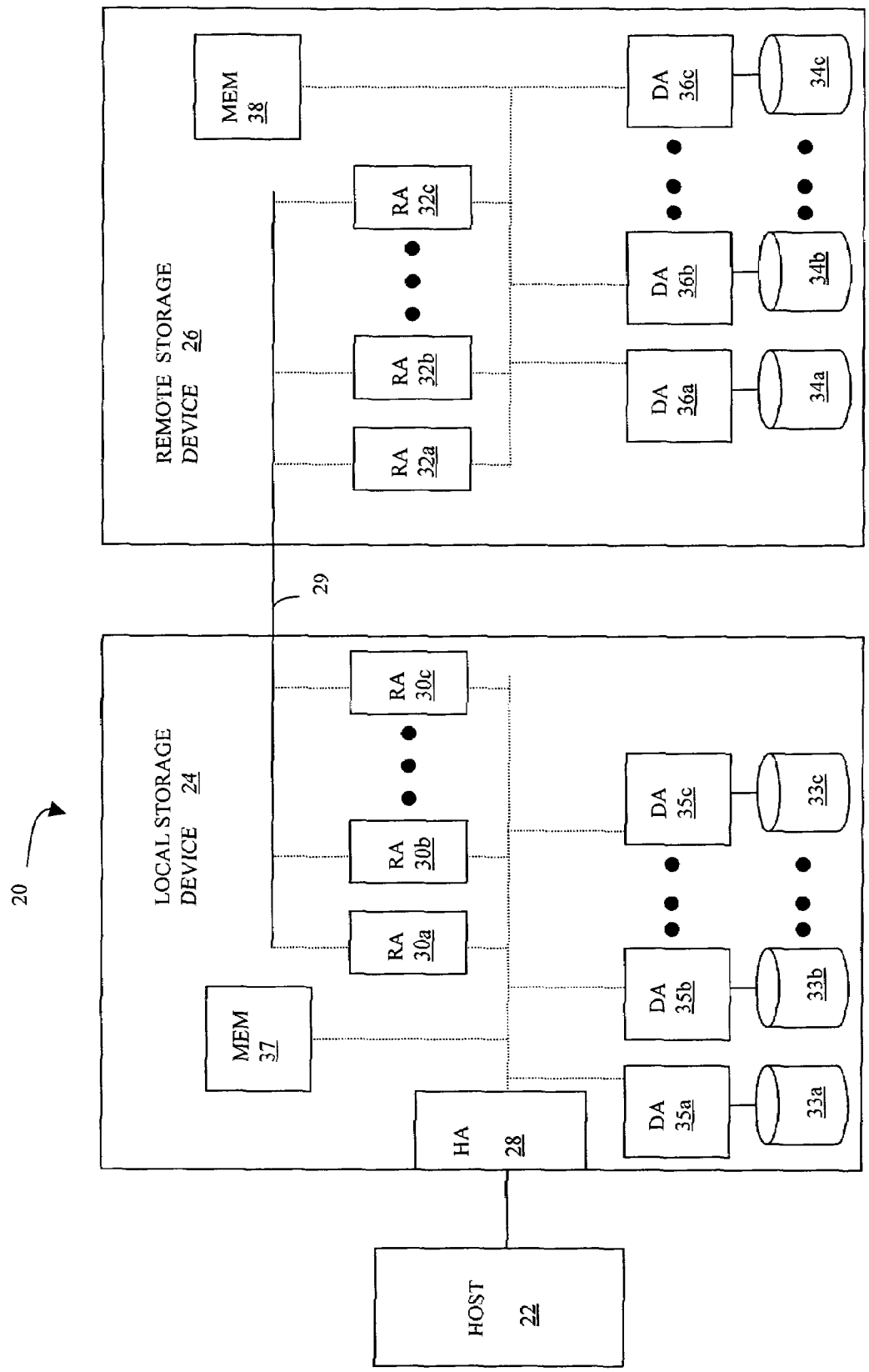
FIG. 1 is a schematic diagram showing a host, a local storage device, and a remote data storage device used in connection with the system described herein.

Referring to FIG. 1, a diagram 20 shows a relationship between a host 22, a local storage device 24 and a remote storage device 26. The host 22 reads and writes data from and to the local storage device 24 via a host adapter (HA) 28, which facilitates the interface between the host 22 and the local storage device 24. Although the diagram 20 only shows one host 22 and one HA 28, it will be appreciated by one of ordinary skill in the art that multiple HA's may be used and that one or more HA's may have one or more hosts coupled thereto.

Data from the local storage device 24 is copied to the remote storage device 26 via an RDF link 29 to cause the data on the remote storage device 26 to be identical to the data on the local storage device 24. Although only the one link 29 is shown, it is possible to have additional links between the storage devices 24, 26 and to have links between one or both of the storage devices 24, 26 and other storage devices (not shown). Note that there may be a time delay between the transfer of data from the local storage device 24 to the remote storage device 26, so that the remote storage device 26 may, at certain points in time, contain data that is not identical to the data on the local storage device 24. Communication using RDF is described, for example, in U.S. Pat. No. 5,742,792, which is incorporated by reference herein.

The local storage device 24 includes a first plurality of RDF adapter units (RA's) 30a, 30b, 30c and the remote storage device 26 includes a second plurality of RA's 32a-32c. The RA's 30a-30c, 32a-32c are coupled to the RDF link 29 and are similar to the host adapter 28, but are used to transfer data between the storage devices 24, 26. The software used in connection with the RA's 30a-30c, 32a-32c is discussed in more detail hereinafter.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The RDF functionality described herein may be applied so that the data for at least a portion of the disks 33a-33c of the local storage device 24 is copied, using RDF, to at least a portion of the disks 34a-34c of the remote storage device 26. It is possible that other data of the storage devices 24, 26 is not copied between the storage devices 24, 26, and thus is not identical.

Each of the disks 33a-33c is coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 are used to provide data to corresponding ones of the disks 34a-34c and receive data from corresponding ones of the disks 34a-34c. An internal data path exists between the DA's 35a-35c, the HA 28 and the RA's 30a-30c of the local storage device 24. Similarly, an internal data path exists between the DA's 36a-36c and the RA's 32a-32c of the remote storage device 26. Note that, in other embodiments, it is possible for more than one disk to be serviced by a DA and that it is possible for more than one DA to service a disk.

The local storage device 24 also includes a global memory 37 that may be used to facilitate data transferred between the DA's 35a-35c, the HA 28 and the RA's 30a-30c. The memory 37 may contain tasks that are to be performed by one or more of the DA's 35a-35c, the HA 28 and the RA's 30a-30c, and a cache for data fetched from one or more of the disks 33a-33c. Similarly, the remote storage device 26 includes a global memory 38 that may contain tasks that are to be performed by one or more of the DA's 36a-36c and the RA's 32a-32c, and a cache for data fetched from one or more of the disks 34a-34c. Use of the memories 37, 38 is described in more detail hereinafter.

The storage space in the local storage device 24 that corresponds to the disks 33a-33c may be subdivided into a plurality of volumes or logical devices. The logical devices may or may not correspond to the physical storage space of the disks 33a-33c.

Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c.

Providing an RDF mapping between portions of the local storage device 24 and the remote storage device 26 involves setting up a logical device on the remote storage device 26 that is a remote mirror for a logical device on the local storage device 24. A mirror is a standard logical device on a remote storage device configured to be a copy of a standard logical device on a local storage device. The host 22 reads and writes data from and to the logical device on the local storage device 24 and the RDF mapping causes the data that has been modified to be transferred from the local storage device 24 to one or more mirrors of the remote storage device 26 (or of another remote storage device, not shown) using the RA's, 30a-30c, 32a-32c and the RDF link 29. In steady state operation, the mirror on the remote storage device 26 contains data that is identical to the data of the logical device on the local storage device 24. The logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume.

Referring to FIG. 2, a diagram 70 shows a standard logical device 72 of the local storage device 24 that contains data written by the host 22 and shows a cache 88 that is part of the global memory 37 of the local storage device 24. The logical storage device 72 corresponds to the disks 33a-33c of FIG. 1. The cache 88 contains a plurality of cache slots 102-104 that may be used in connection to writes to the standard logical device 72 and, at the same time, used in connection with communication of data from the local storage device 24 to the remote storage device 26 using RDF.

When data is written by the host 22 to the local storage device 24, the data is provided to the cache 88. The data will not be removed from the cache 88 until the data is destaged to the standard logical device 72 and, in the case of data that is to also be written to the remote storage device 26, until the data has also been transferred and receipt has been acknowledged by the remote storage device 26. In other words, if the logical storage device 72 has a corresponding remote mirror on the remote storage device 26, data written by the host 22 to the logical storage device 72 is first written to the cache 88 and is not removed from the cache 88 until the data has been destaged to the physical disk of the local storage device 24 and, in addition, the data has also been successfully transferred to the remote storage device 26. In some embodiments, the data of the cache 88 is marked for removal from the cache 88 so that the slot may be returned to a pool of slots for later, usually unrelated, use.

Referring to FIG. 3, a slot 120, like one of the slots 102-104 of the cache 88, includes a header 122 and data 124. The header 122 corresponds to overhead information used by the system to manage the slot 120. The data 124 is the corresponding data for the disk (local and/or remote) that is being (temporarily) stored in the slot 120. Information in the header 122 includes pointers back to the disk and other overhead information used by the system.

The header 122 also includes a wp field 126 used in connection with the system described herein to indicate that the corresponding data is write pending to a local logical device and/or to one or more mirrors. In an embodiment herein, the wp field has one entry for each of four possible mirrors for the standard logical device 72, referred to as M1, M2, M3, and M4. In other embodiments, there may be more or less than four possible mirrors.

The wp field indicates write pending status for each of the mirrors. Of course, in instances where not all possible mirrors are used, the wp field for an unused mirror is also not used. In any event, the slot 120 may not be marked for removal from the cache 88 until all of the wp fields for all of the active mirrors indicate that the slot 120 is no longer write pending for any of the active mirrors. Note that the data structure shown by the diagram 120 of FIG. 3 is exemplary only and that other appropriate data structures may be used to provide the functionality described herein.

Referring to FIG. 4, a diagram illustrates data 200 that is stored in the memory 37 of the local storage device 24. The data 200 is provided for each logical device and includes overhead information that is used in connection with accessing the logical device. The data 200 includes a device header 202 and a plurality of cylinder headers 204-206. In an embodiment herein, each logical device is subdivided into a plurality of cylinders. The number of cylinders may vary and, in an embodiment herein, can be as muck as 64K. In other embodiments, other types of data subdivisions may be used, including variable length subdivisions. Thus, for the discussion herein, the reference to cylinders should be understood to include any appropriate data subdivision.

Each of the cylinder headers 204-206 contains write pending information for the local logical device as well as for each of the mirrors associated with the logical device corresponding to the data 200. Thus, for example, the cylinder header 204 contains per mirror write pending information for cylinder number zero, the cylinder header 205 contains per mirror write pending information for cylinder number one, etc. If any data corresponding to a particular one of the cylinders is written, then the write pending flag for the entire cylinder will be set for all of the mirrors of the cylinder and for the local logical storage device corresponding to the data 200. The write pending information for the cylinder headers 204-206 is cleared as the data is written to the appropriate location.

In an embodiment herein, each cylinder includes up to fifteen tracks of data where each track of data has 32 k bytes or, in a different embodiment, 56 k bytes. A write to any one or more of the bytes for a cylinder will cause a write pending to be set in the cylinder headers 204-206 for each mirror. In other embodiments, each cylinder can include any number of tracks, tracks of lengths other than 32$k$ or 56$k$, tracks of varying length, etc. Each cylinder may be divided in some way other than tracks, etc. Thus, for the discussion herein, it should be understood that any reference to tracks generally includes any appropriate subdivision of cylinder data. Note also that the data structure illustrated by the diagram 200 is exemplary only and that other appropriate data structures may be used to provide the functionality described herein.

Referring to FIG. 5, a track info data element 220 is stored in each of the cylinder headers 204-206. The track info data element 220 includes write pending information for each of the tracks of the cylinder. Note that, as discussed above, in some embodiments there may be up to four mirrors for each logical device while for other embodiments, there may be different numbers of possible mirrors. Thus, the data structure 220 indicates write pending status for each possible mirror for each possible track of a cylinder. The track info data element 220 includes fifteen track data modification indicators 221, each corresponding to a track of the cylinder, and includes a format modification indicator 222. Thus, if track zero has mirrors that are write pending, the appropriate one of the track write data indicators 221 will be marked for the mirrors that are write pending for track zero and, in addition, the corresponding cylinder header 204-206 will also be marked write pending. If format information for a cylinder changes, the format modification indicator 222 will be marked write pending for all of the active mirrors of the device. Of course, for embodiments using different numbers of subdivisions/cylinder, there may be a different number of indicators 221. In addition, in other embodiments, the write pending information may provided using a simple bit/mirror data structure. In addition, in other embodiments, write pending and format pending indicators do not necessarily share the same data structure.

In some instances, it is useful to resolve pending mirror writes for a logical storage device. For example, when the local storage device 24 transitions from ADP copy mode (an asynchronous RDF copy mode), where pending writes are transmitting as a background task, to a synchronous or semi-synchronous RDF mode, it is useful to copy all of the pending writes associated with the ADP copy mode prior to completing the transition to the synchronous or semi-synchronous RDF transfer mode. Thus, there is an intermediate transition state where new writes by the host are handled in a synchronous or semi-synchronous RDF mode, but the transition to synchronous or semi-synchronous RDF mode is not completed until all of the slots that are write pending to the remote storage device 26 from the previous ADP copy mode have been copied to the remote storage device 26.

In such a transition, it is possible to lock the data 200, scan all of the cylinder headers 204-206, and write all the data for the remote mirrors prior to allowing the host 22 to continue writing to the logical storage device. However, the delays caused by this may be unacceptable. In addition, as described in U.S. Pat. No. 6,304,946, which is incorporated by reference herein, certain efficiencies may be obtained by using a tree data structure to keep track of which of the cylinder headers 204-206 are write pending. Note also that a list structure may used in place of a tree. However, the overhead required for this transition, with or without the tree or list structures, may be unacceptable in some situations. The solution presented below avoids use of the tree or list data structures to keep track of cylinder headers indicating write pending mirrors and eliminates the need to lock the entire data structure 200 while write pendings are resolved during a transition from ADP Copy mode to synchronous or semi-synchronous RDF mode.

In the system described herein, each of the RA's 30a-30c of the local storage device 24 scans a portion of the cache 88 of the local storage device 24 to determine if any of the slots are write pending to the remote storage device 26 (or to another remote storage device, not shown). If so, one of the RA's 30a-30c will transfer the data from the local storage device 24 to the remote storage device 26 in order to clear the write pending for the slot.

Referring to FIG. 6, the device header 202 is shown as including a plurality of counters 232-235 where the counter 232 corresponds to a first remote mirror (M1), the counter 233 corresponds to a second remote mirror (M2), the counter 234 corresponds to a third remote mirror (M3), and the counter 235 corresponds to a fourth remote mirror (M4). As discussed in more detail herein, the counters 232-235 may be used to facilitate resolving pending writes for a logical storage device during a transition from ADP copy mode to synchronous or semi-synchronous RDF mode. Of course, in embodiments where there are more or less possible mirrors, there will be an appropriate number of more or less counters. Note also that it is possible to store the counters 232-235 in a location other than the device header 202.

Figure 7:
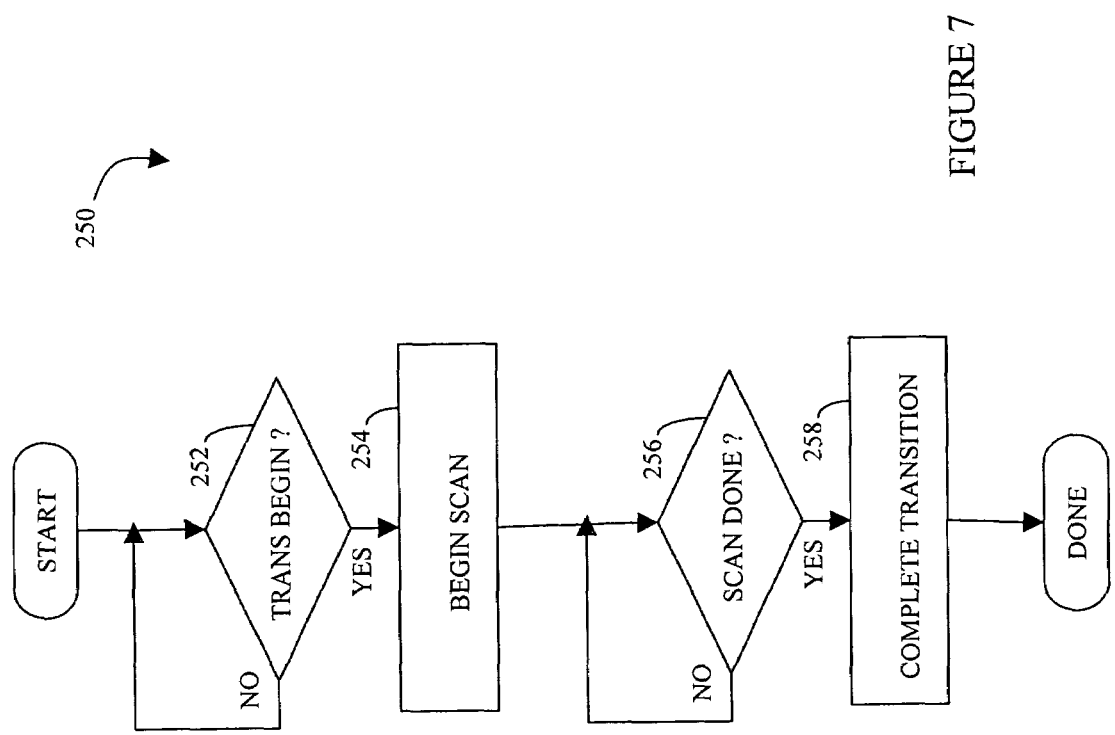
FIG. 7 is a flow chart illustrating steps performed in connection with resolving write pending slots according to the system described herein.

Referring to FIG. 7, a flowchart 250 illustrates steps performed in connection with transitioning from ADP copy mode to a synchronous or semi-synchronous RDF transfer mode. Processing begins at a first test step 252 which determines if the transition has begun. If not, the step 252 loops back on itself to continue polling. Alternatively, if the transition has begun, processing transfers from the test step 252 to a step 254 where a scan is begun of all of the write pending data in the cache 88 left over from the ADP copy mode. The scanning performed at the step 254 is described in more detail elsewhere herein. Following step 254 is a test step 256 which determines if the scan has been completed. If not, control transfers from the step 256 back on itself to continue polling to wait for the scan to be complete. Otherwise, control transfers from the step 256 to step 258 where the transition is completed so that the local storage device 24 has completed the transition into synchronous or semi-synchronous RDF transfer mode. Following the step 258, processing is complete.

Figure 8:
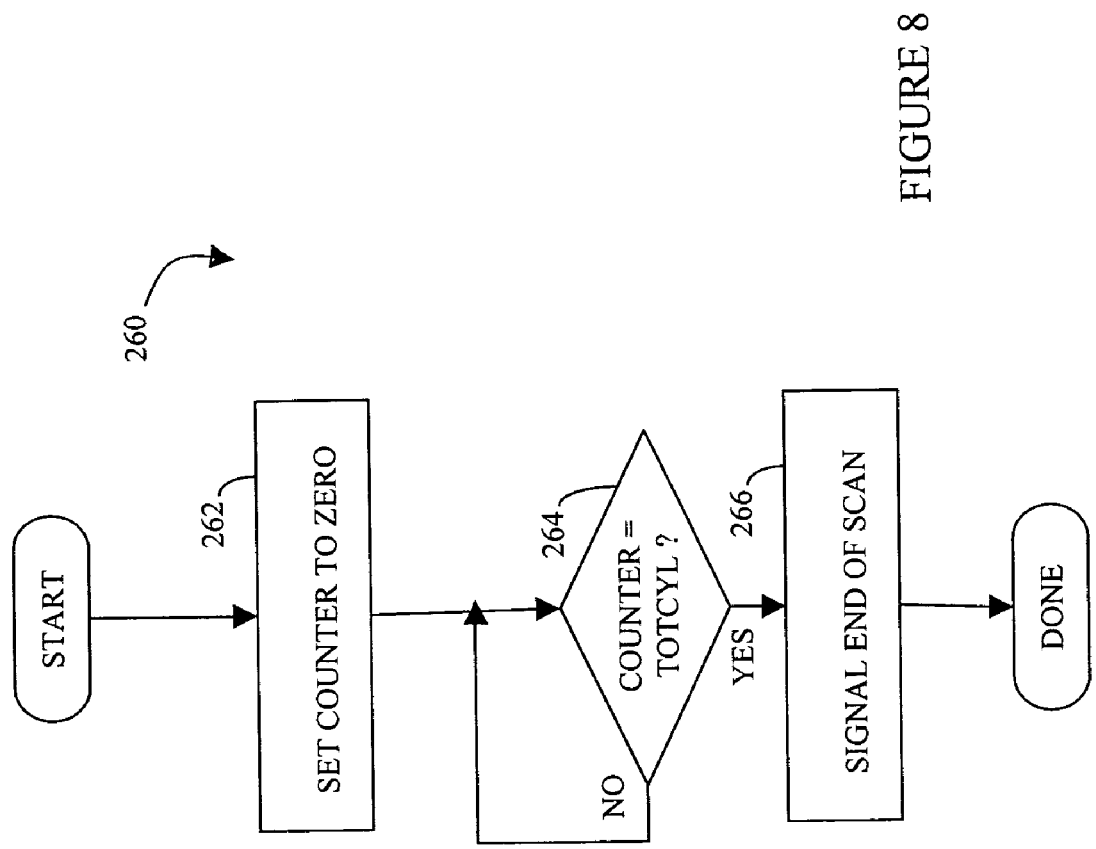
FIG. 8 is a flow chart illustrating steps performed in connection with scanning cylinders for write pending indicators according to the system described herein.

Referring to FIG. 8, a flowchart 260 illustrates steps performed in connection with the RA's 30a-30c scanning the cache 88 to transfer write pending data from the local storage device 24 to the remote storage device 26. Processing begins with a first step 262 where the appropriate one of the counters 232-235, discussed above in connection with FIG. 6, is set to zero. Note that the processing illustrated herein is for one of the mirrors but that, in instances where there are multiple mirrors, the same processing may be used for each of the mirrors to handle all of the write pending data left over from the ADP copy mode.

Following step 262 is a test step 264 which determines if the counter is equal to the total number of cylinders of the device. As discussed elsewhere herein, other processes update (increment) the counter. The scan is complete when the counter equals the number of cylinders of the device. If it is determined that the test step 264 that the counter does not equal the number of cylinders, then the step 264 loops back on itself to continue pulling until the counter equals the number of cylinders. Otherwise, control transfers from the step 264 to a step 266 where the end of scan is signaled. The end of scan signal provided at the step 266 may be used at the test step 256 of the flow chart 250 of FIG. 7 to determine that scanning is complete. Following step 266 processing is complete.

Figure 9:
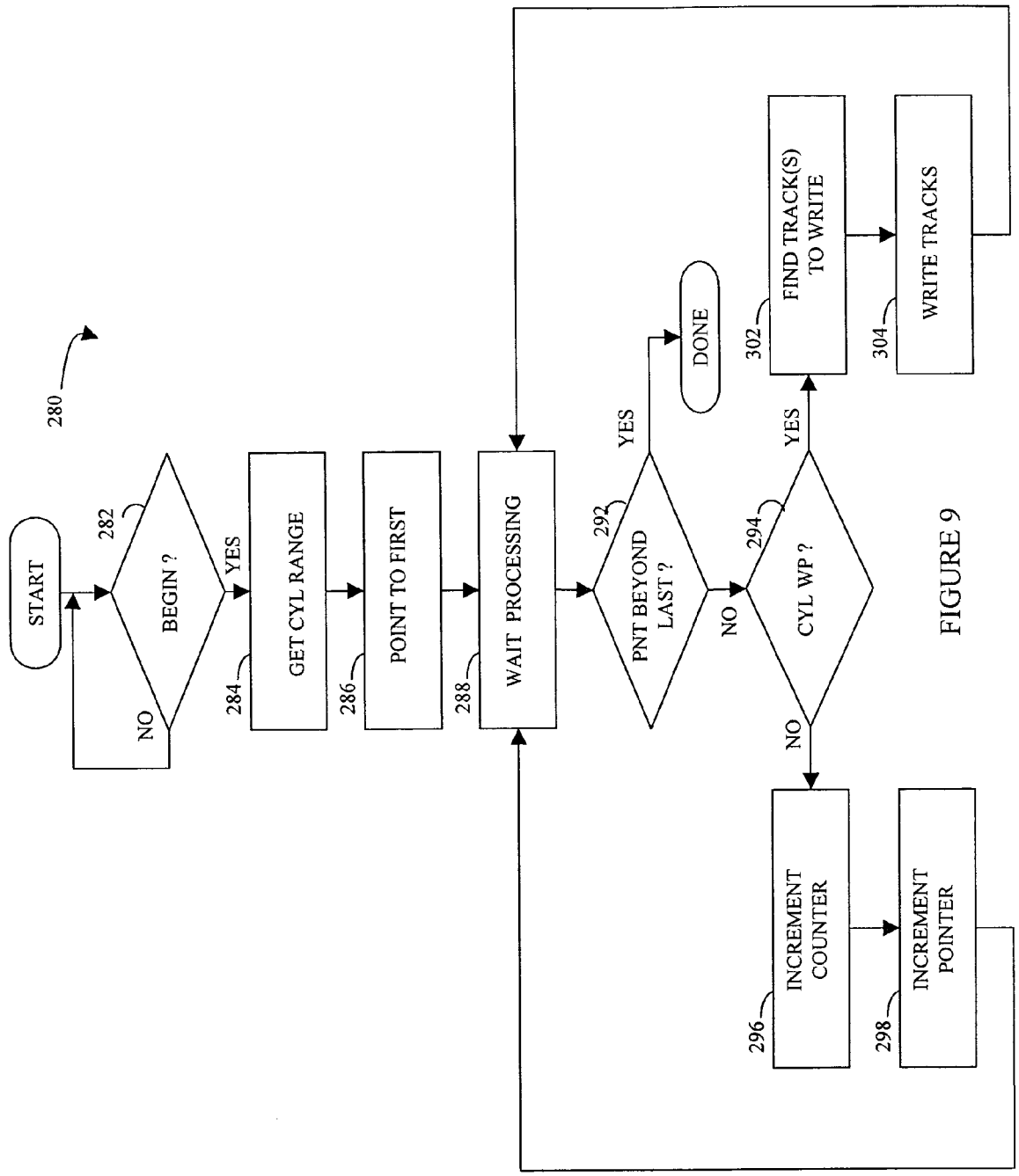
FIG. 9 is a flow chart illustrating steps performed in connection with each RA scanning a range of cylinders for write pending data according to the system described herein.

Referring to FIG. 9, a flow chart 280 illustrates steps performed by each of the RA's 30a-30c of the local storage device in connection with a process for scanning the cache 88 of the local storage device 24 to resolve write pending data from a previous ADP copy state for a transition to a synchronous or semi-synchronous RDF transfer mode. Processing begins at a first test step 282 which determines if a signal to begin the scan has been received. The step 282 represents polling until it is time for the RA to begin scanning. In certain situations, such as after the transition has been completed or if no transition has been initiated, it is inappropriate for the RA to be scanning and resolving write pending data. Thus, the test step 282 represents that the RA will not perform the scanning process illustrated by the flow chart 280 unless and until the RA receives an appropriate indication to begin the process.

If it is determined at the test step 282 that it is appropriate to begin scanning, control transfers from the test step 282 to a step 284 where the RA obtains a cylinder range to be scanned. As discussed elsewhere herein, each of the RA's scans a particular cylinder range and is thus responsible for resolving write pending data for a portion of the cylinders. Obtaining the cylinder range to be scanned at the step 284 is discussed in more detail elsewhere herein.

Following step 284 is a step 286 where a pointer is made to point to the first cylinder header that the RA will be scanning. Following the step 286 is a step 288 where wait processing is performed. In some embodiments, it is useful for the process illustrated by the flow chart 280 to wait in between examining each cylinder so that the process may be a low priority process that does not interfere with other operations of the RA. Accordingly, in an embodiment herein, wait processing is performed at the step 288 to have the process wait between each iteration. In an embodiment herein, the wait processing performed at the step 288 delays one half second between each iteration.

Following the step 288 is a test step 292 which determines if the pointer used to point to each of the cylinder headers points beyond the last cylinder header in the range obtained at the step 284. If so, then processing is complete. Otherwise, control transfers from the step 292 to a test step 294 to determine if the cylinder being examined is write pending for the mirror being processed. If not, then control transfers from the step 294 to a step 296 where the counter, which is one of the counters 232-235 illustrated in FIG. 6 and discussed above, is incremented. Incrementing the counter at the step 296 may be performed by locking the counter (to prevent access by other processes thereto) and then incrementing or by performing a compare and swap operation. In any event, it is useful that incrementing the counter at the step 296 is done without any other processes interfering with the counter at the same time. Following the step 296 is a step 298 where the pointer used to point to each of the cylinder headers is incremented. Following step 298, control transfers back to the step 288 to perform wait processing, as discussed above.

If it is determined at the test step 294 that the cylinder being pointed to is write pending for the mirror being processed, then control transfers from the step 294 to a step 302 to determined the tracks that need to be written. Determining the tracks that need to be written at step 302 is discussed in more detail elsewhere herein. Following the step 302 is a step 304 where the tracks are written using conventional RDF processing as discussed, for example, in U.S. Pat. No. 5,742,792, which is incorporated by reference herein. Following the step 304, control transfers back to the step 288 to perform wait processing, as discussed above.

Note that if each of the RA's performs the steps illustrated by the flow chart 280 then, when all of the RA's have completed their tasks, the counter incremented at the step 296 by each of the RA's should equal the number of cylinders of the device. When this occurs, the test at that step 264 of the flow chart 260 of FIG. 8 will determine that the counter equals the number of cylinders of the device and control will transfer from the step 264 to the step 266, as discussed above.

Figure 10:
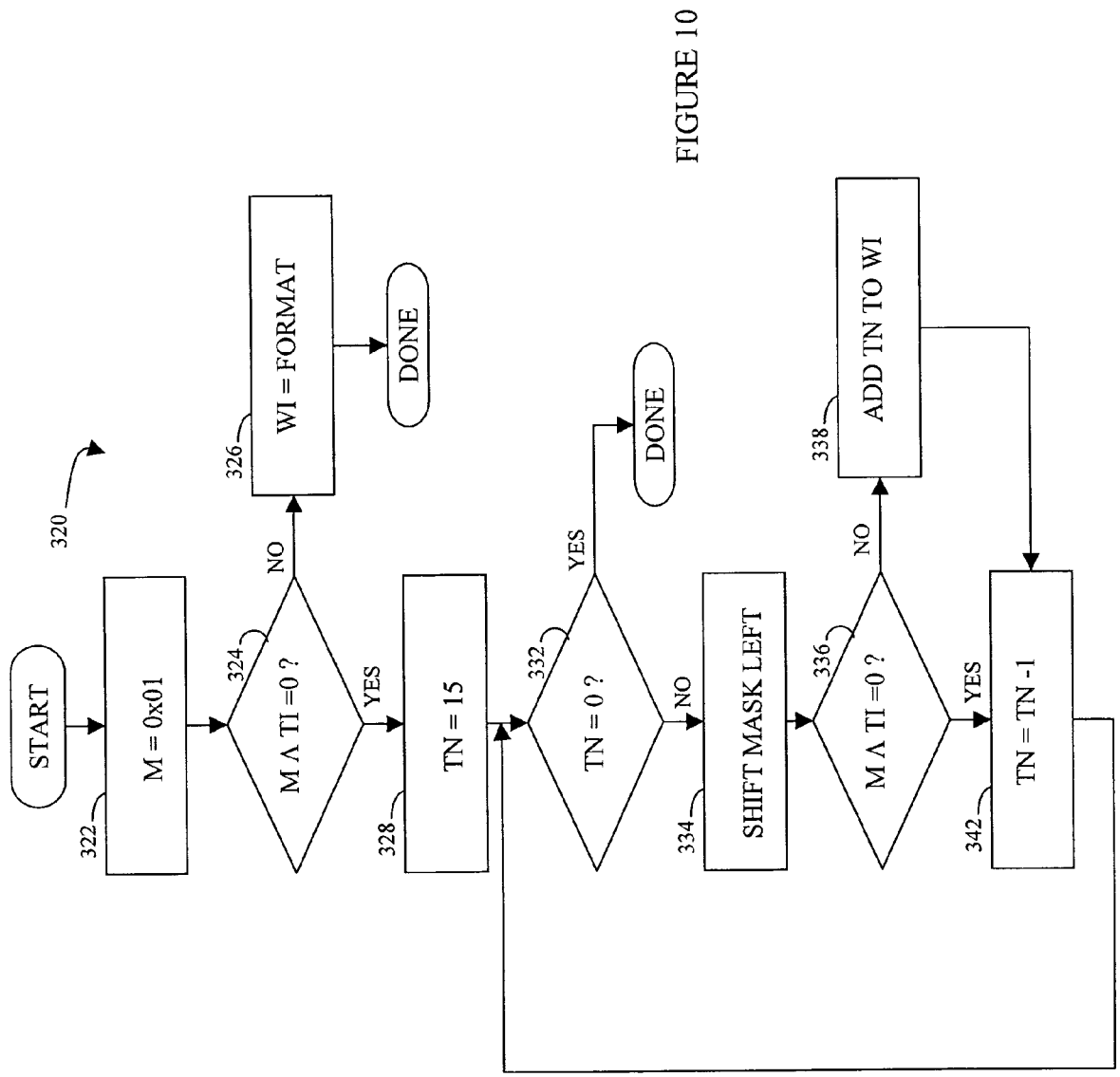
FIG. 10 is a flow chart illustrating steps performed in connection with determining which tracks of a cylinder are write pending according to the system described herein.

Referring to FIG. 10, a flow chart 320 illustrates in more detail the step 302 of the flow chart 280 of FIG. 9 for determining which tracks of a cylinder are write pending. The embodiment shown by the flow chart 320 assumes that there are fifteen tracks per cylinder and assumes a specific data structure for the track write pending information. Of course, the processing may be appropriately adjusted for embodiments with different numbers of tracks (subdivisions)/cylinder and/or different track write pending information.

Processing begins at a first step 322 where a mask value, M, is set equal to 0×01. Following the step 322 is a test step 324 which determines if the result of ANDing the mask and the track info, TI, (which corresponds to the data 220 of FIG. 5, discussed above) is zero. If not, then control transfers from the test step 324 to a step 326 where the write information, WI, is set to indicate that at least some of the cylinder information that needs to be written is format information (as opposed to track data).

If it is determined at the test step 324 that the result of ANDing the mask, M, and the track information, TI, is zero, then control transfers from the step 324 to a step 328 where a track number variable, TN, is set equal to fifteen (i.e., the number of tracks per cylinder in the embodiment illustrated herein). Following the step 328 is a test step 322 which determines if the track number, TN, equals zero, thus indicating that all of the track info data has been examined. If it is determined at the test step 322 that the track number, TN, equals zero, then processing is complete. Otherwise, control transfers from the test step 322 to a step 334 where the mask, M, is shifted left one bit.

Following the step 334 is a test step 336 which determines if the result of ANDing the mask, M, and the track info, TI, equals zero. If not, then control transfers from the test step 336 to a step 338 where the track number is added to the write info, WI. Note that more than one track of a cylinder can be write pending. Thus, the write info WI that is accumulated at the step 338 may include numbers of different tracks of the cylinder. Following the step 338 or following the test step 336 if the AND of the mask and the track info is zero is a step 342 where the track number is decremented. Following the step 342, control transfers back up to the test step 332 to iterate through the next loop.

Figure 11A:
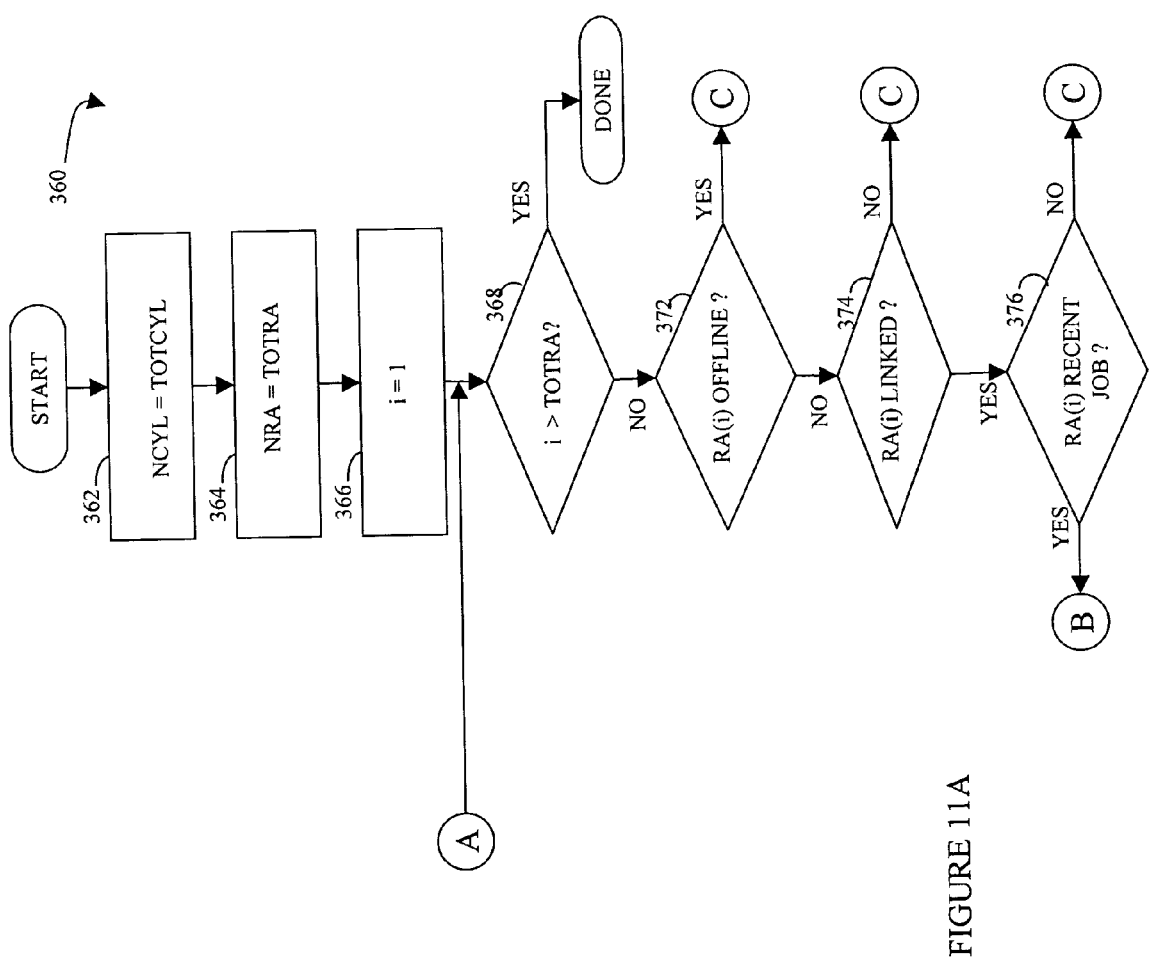
FIGS. 11A and 11B show a flow chart illustrating steps performed in connection with assigning ranges of cylinders for each of the RA's to scan according to the system described herein.
Figure 11B:
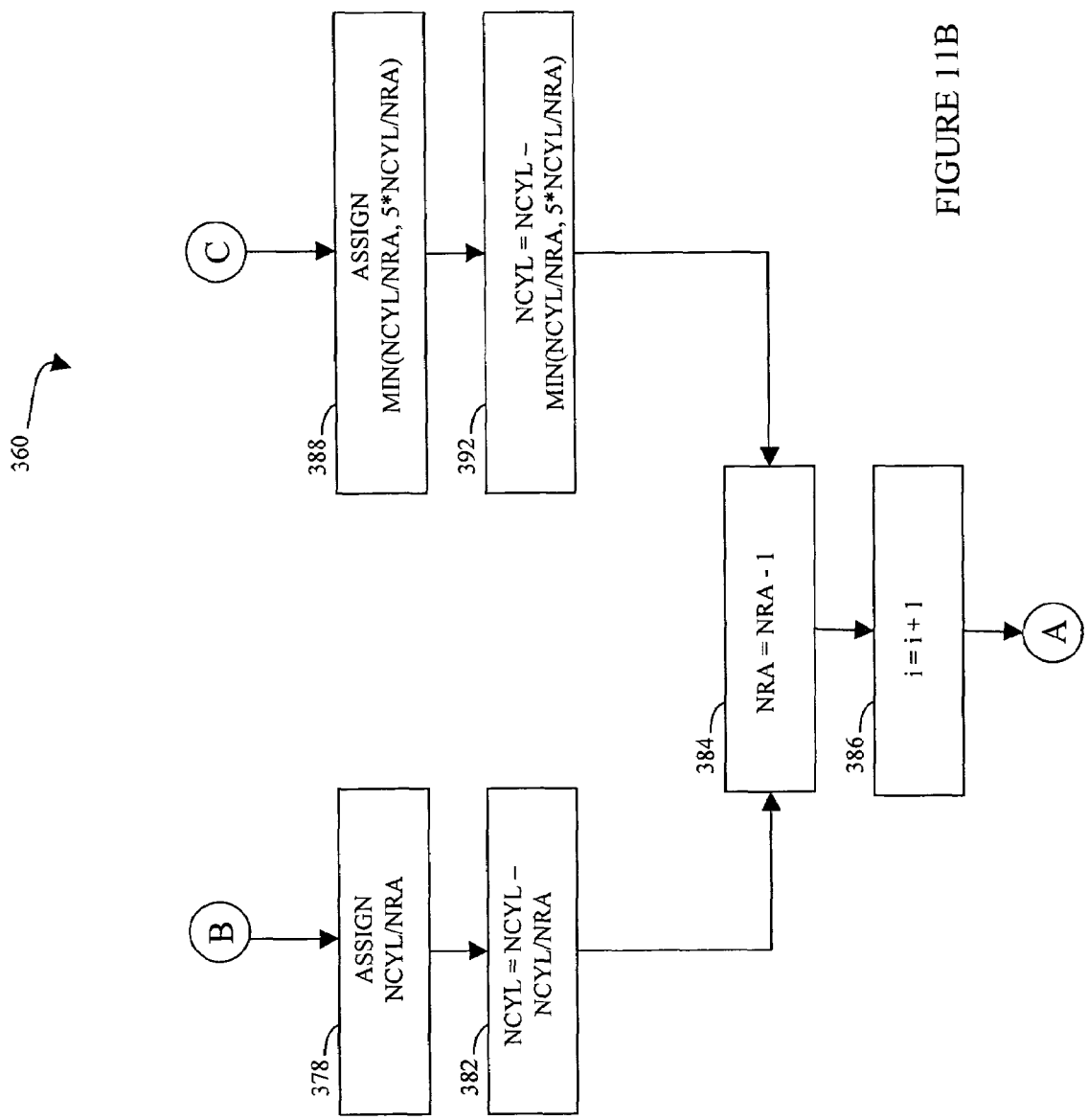

Referring to FIGS. 11A and 11B, a flow chart 360 illustrates steps performed in connection with the obtaining the cylinder range step 284 of the flow chart 280 of FIG. 9. Off-page connectors A, B, and C show the relationship between FIGS. 11A and 11B. Of course, for embodiments that use device subdivisions other than cylinders, the processing illustrated by the flow chart 360 may be adjusted appropriately.

Processing begins at a first step 362 where a variable NCYL is set equal to the total number of cylinders of the device. Following the step 362 is a step 364 where a variable NRA is set equal to the total number of RA's of the device. Following the step 364 is a step 366 where an index variable, i, is set equal to one.

Following the step 366 is a test step 368 which determines if i is greater than the total number of RA's of the device. If so, then processing is complete. Otherwise, control transfers from the test step 368 to a test step 372 which determines if the ith RA is off-line. If not, then control transfers from the test step 372 to a test step 374 which determines if the ith RA has any links thereto. If so, then control transfers from the test step 374 to a test step 376 which determines if the ith RA has performed a recent job. The determination of the test step 376 may relate to whether the ith RA has created any jobs in a predetermined number of iterations or a predetermined amount of time, such as three seconds. If so, then control transfers from the test step 376 to a step 378 where the range of cylinders assigned to the ith RA is set equal to NCYL divided by NRA. Thus, for example, if NCYL equals 4000 and NRA equals eight, then the ith RA will be assigned 500 cylinders to scan at the step 378.

Following the step 378 is a step 382 where the variable NCYL is decremented by the number of cylinders assigned at the step 378. Following step 382 is a step 384 where the variable NRA is decremented by one. Following the step 384 is a step 386 where the index variable i is incremented. Following step 386, control transfers back to the step 368 to perform the next iteration.

If a particular RA is either off-line, has no links thereto, or has not performed a recent job, it may be desirable to assign that RA more cylinders to scan than an otherwise busy RA. Thus, if it is determined at the test step 372 that the ith RA is off-line or if it is determined at the test step 374 that the ith RA has no links thereto, or if it is determined at the test step 376 that the ith RA has not performed any recent jobs, then control transfers from one of the steps 372, 374, 376 to a step 388 where the ith RA is assigned a range of cylinders to scan containing the minimum of NCYL/NRA and 5*NCYL/NRA (five times the number of cylinders assigned at the step 378). Following step 388, control transfers to the step 392 where the variable NCYL is decremented by the number of cylinders assigned at the step 388. Following step 392, control transfers to the step 384, discussed above, where the NRA variable is decremented by one. Processing from the step 384 is as described above.

The system described herein may be extended to other uses and may be adapted to situations where it is useful to transfer write pending data. Such applications include transitions between RDF modes other than those illustrated herein, transitions between RDF modes and non-RDF modes, and transitions between non-RDF modes.

While the invention has been disclosed in connection with various embodiments, modifications thereon will be readily apparent to those skilled in the art. Accordingly, the spirit and scope of the invention is set forth in the following claims.

What is claimed is:

1. A method of transferring data from a local storage device to a remote storage device, comprising:
    providing, to a portion of the local storage device, data to be transferred from the local storage device to the remote storage device using a first mode that accesses an indicator of data being transferred;
    selecting a second mode for transferring data different from the first mode, wherein the second mode does not require the indicator;
    subdividing the portion of the local storage device into chunks;
    for each of the chunks, transferring the data;
    after all of the data from the chunks has been transferred, using the second mode for transferring data that is provided to the local storage device after selecting the second mode; and
    prior to all of the data from the chunks being transferred, using a transition mode different from the first and second modes to transfer data that is provided to the local storage device after selecting the second mode, wherein the transition mode does not require the indicator.

2. A method, according to claim 1, wherein the indicator indicates a subsection of the local storage device is being transferred.

3. A method, according to claim 2, wherein the local storage device is subdivided into cylinders and the cylinders are subdivided into tracks and wherein the indicator includes a first data element indicating which cylinders contain data to be transferred and a second data element indicating which tracks contain data to be transferred.

4. A method, according to claim 1, further comprising:
    providing at least one counter that keeps track of data within the chunks that have been examined for possible transferring to the remote storage device.

5. A method, according to claim 4, further comprising:
    determining that all of the chunks have been transferred when the at least one counter indicates that all of the data has been examined.

6. A method of transferring data from a local storage device to a plurality of remote storage devices, comprising:
    providing, to a portion of the local storage device, data to be transferred from the local storage device to the remote storage devices using a first mode that accesses an indicator of data being transferred;
    selecting a second mode for transferring data different from the first mode, wherein the second mode does not require the indicator;
    subdividing the portion of the local storage device into chunks;
    for each of the chunks, transferring the data;
    for each of the remote storage devices, after all of the data from the chunks has been transferred, using the second mode for transferring data that is provided to the local storage device after selecting the second mode; and
    prior to all of the data from the chunks being transferred to a particular one of the remote storage devices, using a transition mode different from the first and second modes to transfer, to the particular one of the remote storage devices, data that is provided to the local storage device after selecting the second mode, wherein the transition mode does not require the indicator.

7. A method, according to claim 6, further comprising:
    providing a counter for at least one of the remote storage devices that keeps track of data within the chunks that have been examined for possible transferring to the at least one of the remote storage devices.

8. A method, according to claim 7, further comprising:
    determining that all of the chunks have been transferred to the at least one of the remote storage devices when the counter indicates that all of the data has been examined.

9. Computer software, provided in a computer-readable medium, that transfers data from a local storage device to a remote storage device, the computer software comprising:
    executable code that provides, to a portion of the local storage device, data to be transferred from the local storage device to the remote storage device using a first mode that accesses an indicator of data being transferred;
    executable code that subdivides the portion of the local storage device into chunks after a second mode for transferring data different from the first mode has been selected, wherein the second mode does not require the indicator;
    executable code that transfers the data for each of the chunks;
    executable code that, after all of the data from the chunks has been transferred, uses the second mode for transferring data that is provided to the local storage device after selecting the second mode; and executable code that, prior to all of the data from the chunks being transferred, uses a transition mode different from the first and second modes to transfer data that is provided to the local storage device after selecting the second mode, wherein the transition mode does not require the indicator.

10. Computer software, according to claim 9, further comprising:

executable code that provides at least one counter that keeps track of data within the chunks that have been examined for possible transferring to the remote storage device.

11. Computer software, according to claim 10, further comprising:

executable code that determines that all of the chunks have been transferred when the at least one counter indicates that all of the data has been examined.

12. Computer software, provided in a computer-readable storage medium, that transfers data from a local storage device to a plurality of remote storage devices, the computer software comprising:

executable code that provides, to a portion of the local storage device, data to be transferred from the local storage device to the remote storage devices using a first mode that accesses an indicator of data being transferred;

executable code that subdivides the portion of the local storage device into chunks after a second mode for transferring data different from the first mode has been selected, wherein the second mode does not require the indicator;

executable code that transfers the data for each of the chunks;

executable code that, for each of the remote storage devices, after all of the data from the chunks has been transferred, uses the second mode for transferring data that is provided to the local storage device after selecting the second mode; and executable code that, prior to all of the data from the chunks being transferred to a particular one of the remote storage devices, uses a transition mode different from the first and second modes to transfer, to the particular one of the remote storage devices, data that is provided to the local storage device after selecting the second mode, wherein the transition mode does not require the indicator.

13. Computer software, according to claim 12, further comprising:

executable code that provides a counter for at least one of the remote storage devices that keeps track of data within the chunks that have been examined for possible transferring to the at least one of the remote storage devices.

14. Computer software, according to claim 13, further comprising:

executable code that determines that all of the chunks have been transferred to the at least one of the remote storage devices when the counter indicates that all of the data has been examined.

15. A system for transferring data to at least one remote storage device, comprising:

a plurality of host adaptors that receive and send commands and data;

at least one memory coupled to the plurality of host adaptors;

a plurality of disk adaptors coupled to the at least one memory and the plurality of host adaptors;

a plurality of disk drive units coupled to the plurality of disk adaptors;

a plurality of data transmission adaptors coupled to the plurality of host adaptors, the at least one memory, the plurality of disk adaptors, and the plurality of disk drive units, wherein the data transmission adaptors send data to the at least one remote storage device;

a portion that receives data to be transferred from the local storage device to the remote storage devices using a first mode that accesses an indicator of data being transferred;

executable code that subdivides the portion into chunks after a second mode for transferring data different from the first mode has been selected, wherein the second mode does not require the indicator;

executable code that transfers the data for each of the chunks;

executable code that, for each of the at least one remote storage device, uses the second mode for transferring data that is provided after selecting the second mode, wherein the second modes is used after all of the data from the chunks has been transferred; and executable code that, prior to all of the data from the chunks being transferred, uses a transition mode different from the first and second modes to transfer data that is provided to the local storage device after selecting the second mode, wherein the transition mode does not require the indicator.

16. A system, according to claim 15, further comprising:

executable code that, prior to all of the data from the chunks being transferred, uses a transition mode different from the first and second modes to transfer data that is provided to the system after selecting the second mode, wherein the transition mode does not require the indicator.

* * * * *